C. H. HOOD.
AGITATOR FOR MILK TANKS AND THE LIKE.
APPLICATION FILED DEC. 30, 1913.
1,111,715.
Patented Sept. 22, 1914.
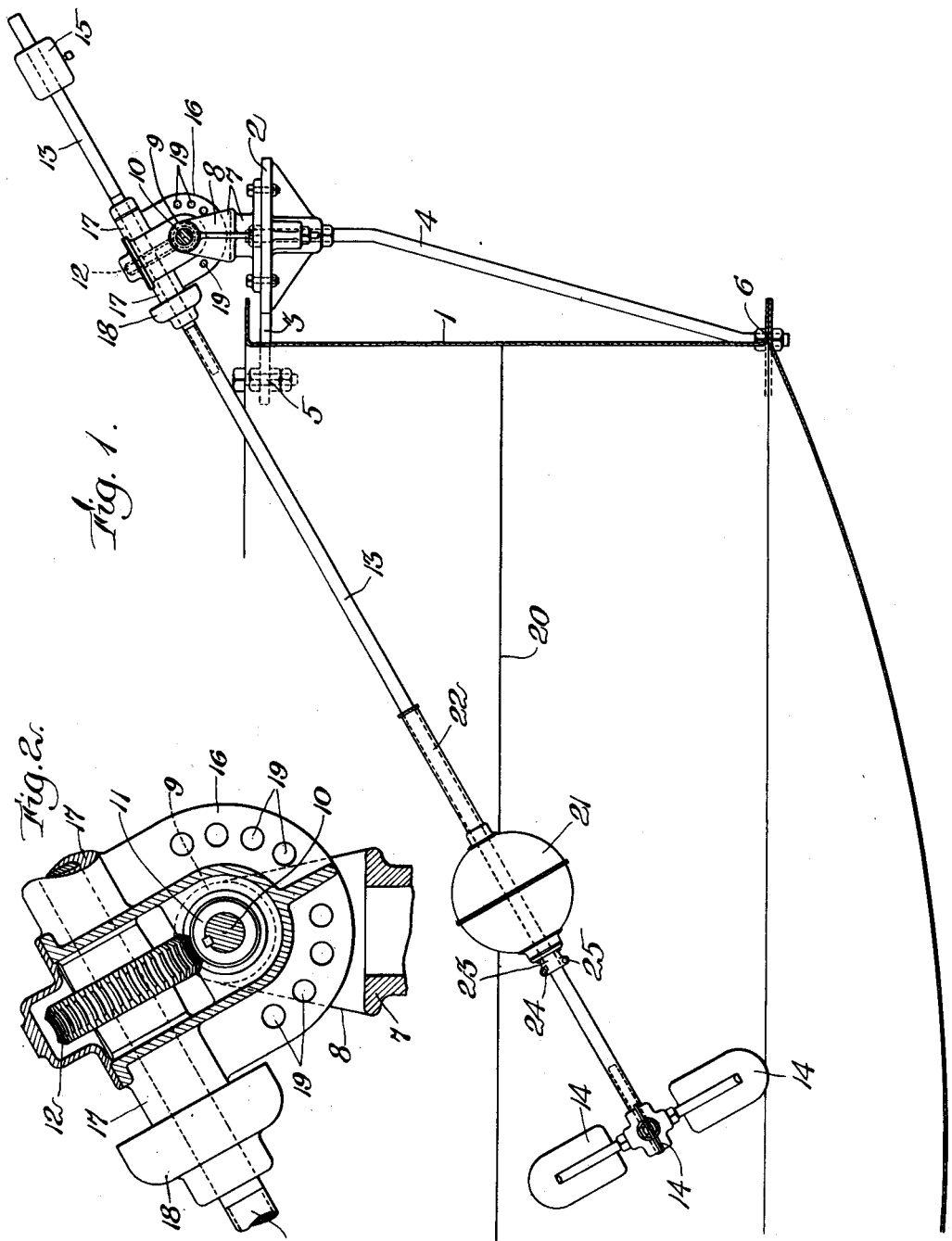
Witnesses:
Edward Maxwell
James R. Hodder
Inventor:
Charles H. Hood,
by Geo. W. Maxwell
Attorney.

UNITED STATES PATENT OFFICE.

CHARLES H. HOOD, OF SOMERVILLE, MASSACHUSETTS, ASSIGNOR TO H. P. HOOD & SONS, OF CHARLESTOWN, MASSACHUSETTS, A CORPORATION OF MASSACHUSETTS.

AGITATOR FOR MILK-TANKS AND THE LIKE.

1,111,715.   Specification of Letters Patent.   Patented Sept. 22, 1914.

Application filed December 30, 1913.   Serial No. 809,491

*To all whom it may concern:*

Be it known that I, CHARLES H. HOOD, a citizen of the United States, and resident of Somerville, county of Middlesex, State of Massachusetts, have invented an Improvement in Agitators for Milk-Tanks and the like, of which the following description, in connection with the accompanying drawings, is a specification, like figures on the drawings representing like parts.

My present invention is an improved type of apparatus for use in maintaining the material within a tank, particularly milk, cream, and the like, suitably agitated to insure a careful mixing of the contents, and a uniformity of the same as drawn off.

In milk depots where a large number of cans of milk are being constantly poured into a receptacle, and drawn off from the bottom of the receptacle, it is highly important to keep the contents in motion and insure the thorough mixing of the milk contained within the reservoir. The milk is usually drawn off from such reservoir near the bottom, and consequently if no method of keeping the contents properly agitated was provided, the constant tendency would be for the butter fat or cream to rise to the top, being of a different specific gravity from the rest of the milk, and therefore the first part drawn off from the reservoir would be skim milk, while the latter part would be cream, with varying degrees of difference between the top and bottom. As the level of the milk in such a reservoir is constantly being varied by the pouring in and drawing off of the contents, it has heretofore been difficult to keep the contents of such a reservoir in constant agitation, except by slow and laborious hand work. A further difficulty is that much agitation will cause air to mix into the contents, which is undesirable. Former mechanical devices have also been unsatisfactory, as no allowance was made for the constantly varying level of the contents of the tank.

I have discovered that the best results are obtained by having a slowly moving agitating device at substantially a predetermined level below the surface of the milk contained in the reservoir, and as this level is constantly varied, I have provided means to permit the agitating blades of the apparatus to follow the level of milk in the reservoir. I also find it to be advantageous to have the apparatus adjusted for different depths below the levels of different grades of milk, and accordingly in the present invention I have provided means for this adjustment.

An important advantage of the present apparatus is that it can be employed in handling milk which has been pasteurized, where the greatest care is requisite, and where any stirring by hand is objectionable.

Other features of the invention, novel combinations of parts, and details of construction will be hereinafter more fully pointed out and claimed.

Referring to the drawings, wherein a preferred embodiment of the invention is illustrated, Figure 1 is a general view of my apparatus, as applied to a reservoir, the sides of the latter being shown in conventional form, and in cross section; and Fig. 2 is a detail view, partly in cross section, of the actuating apparatus to permit location of the stirring blades while allowing them to be raised or lowered to follow the varying level of the contents in the reservoir.

A tank or reservoir is indicated at 1 to which is affixed a bracket 2 by means of supports 3 and 4, bolted to the sides of the tank at 5 and 6. This bracket carries a support 7 having upstanding arms 8 provided with journal bearings 9 adapted to receive the shaft 10, which shaft will be rotated by a pulley, gears, or any other suitable means of affording power (not shown). The shaft 10 has keyed thereon, between the bearings in the arm 8, a worm 11, which is arranged to mesh with a gear 12 fixed on a shaft 13, substantially at right angles to the shaft 10, and having one end extending into the tank 1, and carrying the stirring blades 14 with its other end extending beyond the shaft 9, and carrying a counterweight 15. To support the shaft 13 and permit it to be oscillated about the shaft 9, as well as to hold the worm 11 and gear 12 in mesh, I provide a U-shaped member 16, having bearings 17 in the outer ends of the U-shaped arms for the shaft 13, and arranged to extend around the shaft 10 and worm 11, between the arms 8 of the bracket 7. By this arrangement the rotation of the shaft 10 will at all times impart rotative movement to the gear 12, and shaft 13, while permitting the shaft 13 to be swung or oscillated about the power shaft 9, as the blades 14 may be raised or lowered within the milk contained within the reservoir 1. In order to prevent any oil, grease, or the like from running down the shaft 13, a cup 18 is provided, and to arrange for holding the shaft 13 in a fixed position, a plurality of holes 19 are provided in the member 16, through which a pin may be fitted to hold the member 16 against rotation around the shaft 10, as will be readily understood, said pin spanning the arms 8 and bearing thereagainst.

In order to allow the stirring blades 14 to be maintained at a substantially predetermined depth below the level 20 of the contents in the reservoir 1, I provide a float 21 of sufficient buoyancy to insure the oscillation of the shaft 13 as the level 20 rises or falls. This float is preferably of metal and with a hollow tube 22 therethrough, said tube comprising a bearing for the shaft 13. The float 21 is clamped to the shaft 13 in any desired longitudinal position by a split clamp 23 secured by bolts 24 and 25, or by a setscrew, or in any other wellknown manner. The depth which it is desired to maintain the blades 14 below the level 20 may be determined either by adjusting the float 21 longitudinally on the shaft 13, or may be varied to a limited extent by shifting the counterweight 15.

Rotation of the power shaft 9 will act to correspondingly rotate the shaft 13 and stirring blades 14 at any speed found desirable for the particular work involved, the float 21 and counterweight 15 acting to oscillate the shaft 13 as the level 20 within the tank 1 rises or falls during the continuous filling of the reservoir from cans, and the drawing off of the contents. As this work usually involves unloading milk in large quantities, a carload at a time, and drawing off the milk from the tank into sterilizers and apparatus for filling bottles, or small milk cans, it will be seen that the necessity for constantly mixing the contents of the tank 1 to maintain the same a substantially uniform product, as well as preventing the cream from separating, and also preventing air from being mixed in the contents, or stirring the milk so fast as to produce butter, is of great importance. It will be seen that my apparatus accomplishes this work in a thoroughly sterile manner, and with a minimum of mechanical parts. The adjustments provided enable just the right depth for the blades 14 to be determined, and to keep the same at said depth below the level 20, irrespective of the varying quantities in the reservoir and the constantly varying height of the level 20. Also in the present device, all danger of having oil, grease, dust, or the like work into the tank, as in former constructions having gears over the tank or through the sides, is eliminated.

Having described the invention, what I claim as new and desire to secure by Letters Patent is:

1. Apparatus of the kind described for agitating milk or the like contained within reservoirs, comprising means to stir the contents of the reservoir at a substantially predetermined depth below the level of said contents, said stirring means being automatically raised and lowered as the level of said contents is raised and lowered.

2. Apparatus of the kind described for agitating milk or the like contained within reservoirs, comprising means including a float supported in the contents to stir the contents of the reservoir at a substantially predetermined depth below the level of said contents, irrespective of the variation in level of the contents.

3. Apparatus of the kind described for agitating milk or the like contained within reservoirs, comprising means to agitate the contents of a reservoir at a substantially predetermined depth below the surface, said means including a rotating shaft extending into said tank at an angle, and mechanism to permit said shaft to oscillate with the varying level of said contents.

4. Apparatus of the kind described for agitating milk or the like contained within reservoirs, comprising a driving shaft outside the tank, a driven shaft arranged substantially at right angles to said driving shaft, and extending at an angle into said tank, agitating means on the inner end of the driven shaft, a float to support the driven shaft, and means permitting said shaft to oscillate on the driving shaft during rotation of both shafts to cause said stirring means to remain a predetermined depth below the level of the contents during the variation of said level.

In testimony whereof, I have signed my name to this specification, in the presence of two subscribing witnesses.

CHARLES H. HOOD.

Witnesses:
  FRANK W. NAY,
  GEORGE V. SPIKE.